United States Patent
Printezis et al.

(10) Patent No.: US 7,313,566 B1
(45) Date of Patent: Dec. 25, 2007

(54) METHOD AND APPARATUS FOR ISOLATING SELECTED HEAP OBJECTS USING A FAULTING ADDRESS TRAP

(75) Inventors: Antonios Printezis, Burlington, MA (US); Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 452 days.

(21) Appl. No.: 11/021,260

(22) Filed: Dec. 23, 2004

(51) Int. Cl.
*G06F 17/30* (2006.01)

(52) U.S. Cl. ................................................. 707/101

(58) Field of Classification Search .................... 707/1, 707/2, 206, 101; 712/244; 711/112; 717/148
See application file for complete search history.

(56) References Cited

U.S. PATENT DOCUMENTS

| | | | |
|---|---|---|---|
| 5,920,876 A | 7/1999 | Ungar et al. | |
| 6,115,782 A | 9/2000 | Wolczko et al. | |
| 6,148,310 A | 11/2000 | Azagury et al. | |
| 6,173,294 B1 | 1/2001 | Azagury et al. | |
| 6,185,581 B1 | 2/2001 | Garthwaite | |
| 6,226,653 B1 | 5/2001 | Alpern et al. | |
| 6,243,720 B1 | 6/2001 | Munter et al. | |
| 6,249,793 B1 | 6/2001 | Printezis et al. | |
| 6,308,185 B1 | 10/2001 | Grarup et al. | |
| 6,363,403 B1 | 3/2002 | Roy et al. | |
| 6,381,738 B1 | 4/2002 | Choi et al. | |
| 6,424,977 B1 | 7/2002 | Garthwaite | |
| 6,453,466 B1 | 9/2002 | Eidt et al. | |
| 6,457,019 B1 | 9/2002 | Sexton et al. | |
| 6,490,599 B2 | 12/2002 | Kolodner et al. | |
| 6,571,260 B1* | 5/2003 | Morris | 707/206 |
| 6,826,757 B2 | 11/2004 | Steele et al. | |
| 6,845,437 B2 | 1/2005 | Borman et al. | |
| 6,868,488 B2 | 3/2005 | Garthwaite | |
| 7,076,773 B2* | 7/2006 | Schmidt | 717/148 |
| 2003/0041231 A1* | 2/2003 | Risucci | 712/244 |
| 2004/0003014 A1 | 1/2004 | Nagarajan et al. | |
| 2006/0095659 A1* | 5/2006 | New et al. | 711/112 |

OTHER PUBLICATIONS

Appel, "Simple Generational Garbage Collection and Fast Allocation", Software Practice and Experience, 19(2), 1989, 171-183.
Appel, et al., "Real-Time Concurrent Collection on Stock Multi-processors", ACM SIGPLAN Notices, 1988.
Bacon, et al., "Java without the Coffee Breaks: A nonintrusive Multiprocessor Garbage Collector", SIGPLAN Conference on Programming Language Design and Implementation, Jun. 2001, Snowbird, UT.

(Continued)

*Primary Examiner*—Etienne LeRoux
(74) *Attorney, Agent, or Firm*—Osha Liang LLP

(57) ABSTRACT

All references to an object subset to which an atomic operation is to be applied are deliberately transformed so that an attempt by an application thread to dereference such a transformed reference will raise a faulting address trap. When the faulting address trap is raised, the faulting thread will enter a trap handler, which suspends the faulting thread. The atomic operation can then be applied and the faulting thread restarted.

40 Claims, 6 Drawing Sheets

OTHER PUBLICATIONS

Baker, "List Processing in Real Time on a Serial Computer", Communications of the ACM 21, Apr. 1978, 280-294.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Grarup, et al., "Incremental Mature Garbage Collection", M.Sc. Thesis @ http://www.daimi.aau.dk/jacobse/Papers, Aug. 1993.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Incremental Collection of Mature Objects", Proceedings of the Int'l Workshop on Memory Managment, 1992, pp. 1-16, Springer-Verlag.

Hudson, et al., "Adaptive Garbage Collection for Modula-3 and Small Talk", OOPSLA.ECOOP '90 Workshop on Garbage Collection in Object-Oriented Systems, Oct. 27, 1990.

Hudson, et al., "Sapphire: Copying GC Without Stopping the World", Java Grande/ISCOPE, 2001.

Jones and Lins, "Garbage Collection: Algorithms for Automatic Dynamic Memory Management", 1996, 165-179, John Wiley and Sons, NY.

Lieberman, et al., "A Real-Time Garbage Collector Based on the Lifetimes of Objects", Communications of the ACM, 1983, 26(6).

Moon, "Garbage Collection in a Large Lisp System", Conference Record of the 1984 ACM Symposium on LISP and Functional Programming, Aug. 1984, 235-246, Austin, TX.

Nettles, Scott, "Real-Time Replication Garbage Collection", Avionics Lab, Wright Research and Development Center, 1993, PDDI.

Seligmann, et al., "Incremental Mature Garbage Collection, In the European Conference on Object-Oriented Programming", M.Sc. Thesis @ http://www.daimi.aau.dk/jacobse/Papers/, 1995.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Wilson, "Uniprocessor Garbage Collection Techniques", Technical Report, University of Texas, 1994.

Withington, P.T., "How Real is "Real-Time" GC?", Symbolics, Inc., Oct. 6, 1991, Burlington, MA.

Zorn, Benjamin, "Barrier Methods for Garbage Collection", Dept. of Computer Science, Uni. of Colorado, Nov. 1990, 1-37, Boulder.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Pirinen, Pekka, "Barrier Techniques for Incremental Tracing", Harlequin Limited, Date Unknown, 20-25, Cambridge, Great Britain.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

Detlefs, et al., "Concurrent Remembered Set Refinement in Generational Garbage Collection", Proceedings of the USENIX Java VM '02 Conference, Aug. 1-2, 2002, 14 pages, San Francisco, CA, USA.

* cited by examiner

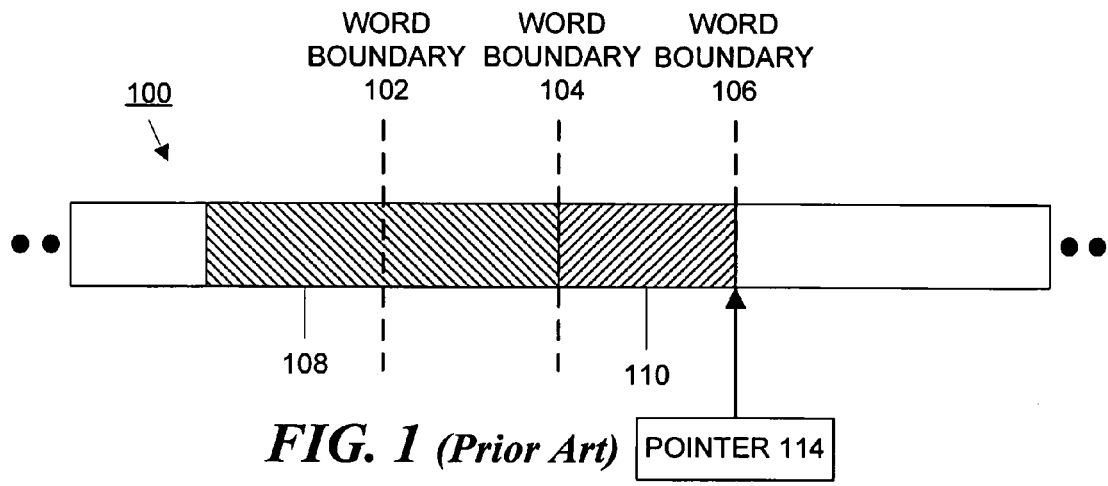
FIG. 1 *(Prior Art)*
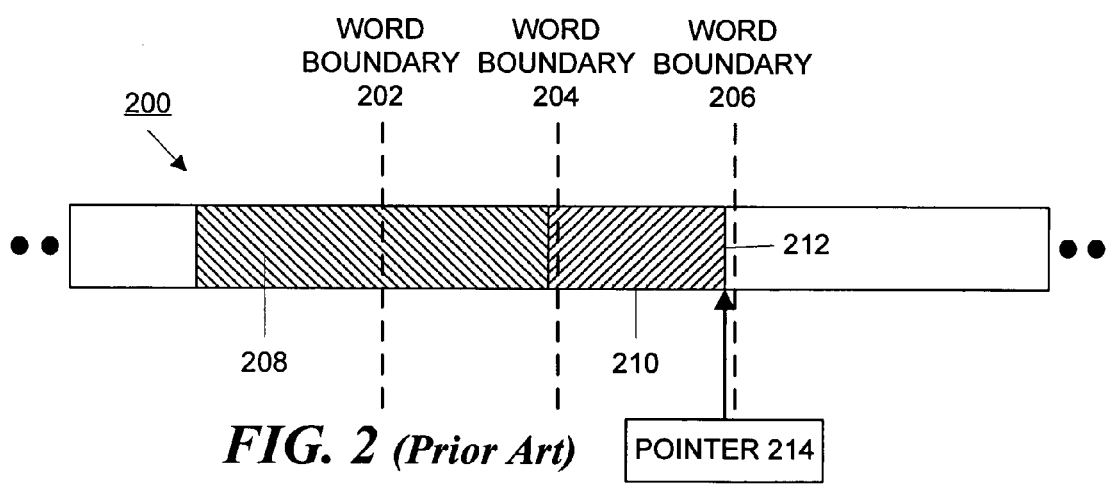
FIG. 2 *(Prior Art)*
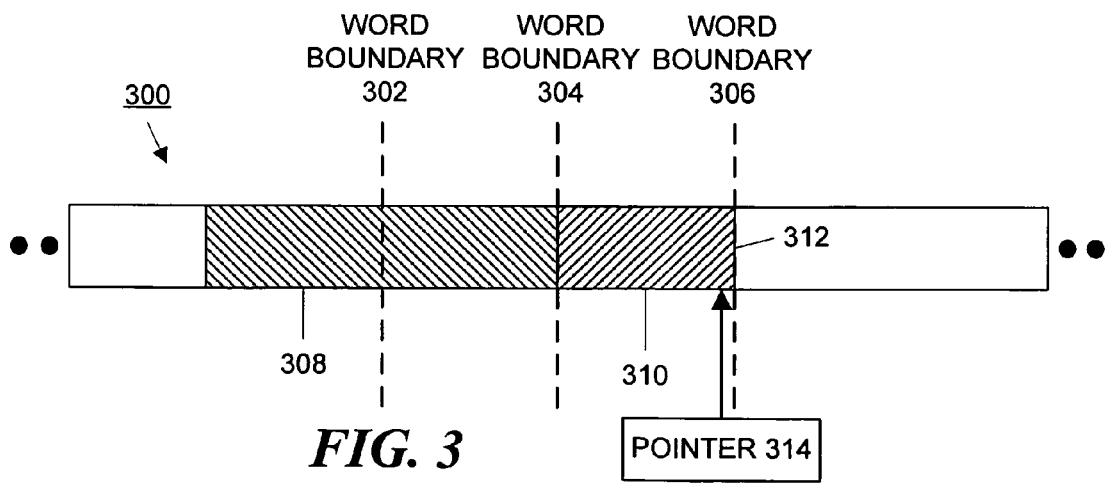
FIG. 3

METHOD AND APPARATUS FOR ISOLATING SELECTED HEAP OBJECTS USING A FAULTING ADDRESS TRAP

FIELD

This invention relates to methods and apparatus for selecting objects in a memory so that an atomic operation can be performed on the selected objects.

BACKGROUND

In implementations of programming languages that support dynamic object allocation, it is sometimes necessary to perform an operation on a possibly large subset of the objects in the heap atomically with respect to the application threads that are accessing the objects. In this context, performing an operation atomically means that one group of threads working on a particular task first selects a subset of the objects in the heap in accordance with some criteria and then obtains exclusive access to the subset of objects for a period of time, isolating that subset of objects from threads outside of the one group for all, or at least part of the time period. During the time period an operation is performed on all of the objects in the subset.

One example of such an operation on selected objects is object relocation. Garbage collectors relocate existing objects and update all references to the relocated objects to reflect their new location. If this relocation operation is not done atomically, different application threads might access both the original object and the relocated object, which will create inconsistencies.

Another example of an atomic operation that can be applied to a subset of objects is schema evolution. In many database management systems, the structure of each database table is defined by a schema. Similarly, in object-oriented programs, each object is defined by a class from which the object is constructed. Object definitions make it possible to make modifications in all objects of a given type simply by modifying the schema. In some cases, the structure of all existing objects of a given type might be changed to reflect a change in the definition of that type. For example, a new field might be added to an object class and it may be necessary to change all existing instances of that class to reflect this change. It is important that these changes be made atomically since, typically, it is important that an application access exactly one version of a given object type.

Still other examples of operations that require atomicity are operations performed by sampling and debugging applications. In performing queries about the behavior of running applications, sampling and debugging applications typically generate a snapshot of the state of some subset of objects in the heap.

The most common conventional method to achieve the required atomicity is to first stop all application threads. Then, the operation is performed on the selected sub-set of objects and finally, all application threads are restarted. Thus, the application threads see one version of the heap just before they are stopped, and after they are restarted they see a new version of the heap, with the operation in question completed. This type of staged operation is often called a "stop-the-world" (STW) operation. For example, most relocating garbage collectors, such as copying garbage collectors and sliding-compacting garbage collectors, perform object relocation in a STW fashion. Specifically, all application threads are stopped, live objects are relocated and all references to them updated. When the application threads are restarted, any reference that they might access is guaranteed to have been updated to reflect the new location of the corresponding object.

However, such STW pauses can be quite long and some applications, such as real-time or interactive applications, cannot tolerate long pauses. Therefore, it is sometimes desirable to perform the atomic operations concurrently, or mostly concurrently, with the operation of the application threads. This requires the atomic operation to be synchronized with the application threads. Synchronizing the atomic operation with the application threads is typically achieved by introducing an explicit "barrier" for all read operations, for all write operations, or for both read and write operations. These barriers operate when an application thread attempts to access an object while the atomic operation is in progress (being performed by another thread). During this attempt, the barrier checks whether the atomic operation has been completed on the object in question. If it has, then the barrier can allow the application thread to access the object. If the atomic operation has not completed, then the barrier can either perform the atomic operation eagerly or wait until another thread completes it.

Since read barriers must typically be added to each dereferencing operation in which a value is obtained by reading the memory at the address of the pointer, they are considered especially expensive (at least a 4% to 10% overhead). Consequently, some effort is made to avoid them or, at least ameliorate the effects. For example, some garbage collectors use write barriers together with an access barrier and an indirection pointer to the current copy of an object. Although such collectors are said to not use read barriers, they effectively incur the same overhead due to the use of an indirection pointer. Other known schemes use specialized hardware to implement the barriers thereby decreasing the overhead cost incurred by software implementations. However, such schemes have not been widely adopted. Other problems with barriers are that they apply to all objects in the heap, even though only a sub-set of the objects will be processed by the atomic operation and, conventionally, they are constantly enabled even though they are only needed when objects are being transformed.

SUMMARY

In accordance with the principles of the invention, all references to the object subset to which the atomic operation is to be applied are deliberately transformed, in a reversible manner, so that a fault occurs on ordinary memory operations, such as loads and stores. When such a fault occurs, a faulting address trap is raised, and the faulting thread will enter a trap handler which suspends the faulting thread. The handler may wait until the atomic operation is applied by another program, may perform operations to accelerate the application of the atomic operation or may apply the atomic operation itself. The faulting thread is then restarted.

In one embodiment, addresses are transformed by misaligning them so that they do not point to a word boundary. An attempt by a thread to dereference such a misaligned reference will raise a misaligned address trap, which is commonly found in most operating systems on most processors. In another embodiment, the references are misaligned by setting their least-significant bit to one.

In another embodiment, references are transformed by setting them to addresses that are memory protected in some manner so that a memory protection fault occurs when an attempt is made to dereference the addresses.

In yet another embodiment, in order to insure that all necessary addresses have been transformed, all application threads are stopped, the addresses are transformed and then the application threads are restarted.

In still another embodiment, most of the addresses are transformed concurrently with application thread processing, then the application threads are stopped to ensure that the rest of the addresses are also transformed.

BRIEF DESCRIPTION OF THE DRAWINGS

FIG. 1 is a schematic diagram that illustrates how four-byte and eight-byte words are typically stored in a memory system.

FIG. 2 is a schematic diagram that illustrates the four-byte and eight-byte words misaligned with respect to word boundaries.

FIG. 3 is a schematic diagram that illustrates the four-byte and eight-byte on word boundaries, but with a misaligned pointer.

DETAILED DESCRIPTION

Figure 4:
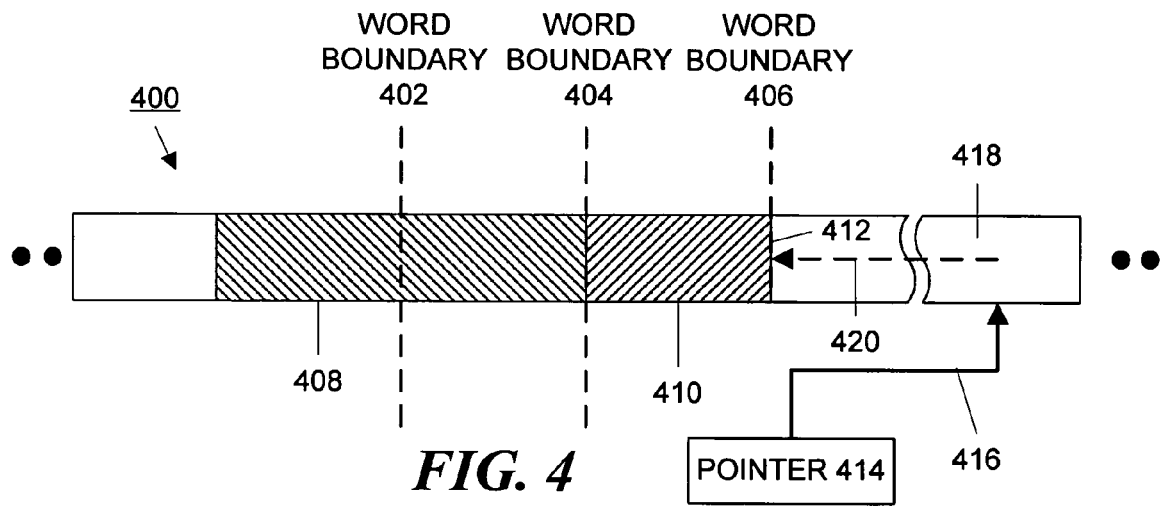
FIG. 4 is a schematic diagram that illustrates the four-byte and eight-byte words aligned with word boundaries, but where a pointer has been transformed by modifying it to point to a protected part of the address space.

For the purpose of this specification, the term "object" refers to a data structure that is represented in the memory of a computing system. This usage of the term object is distinct from the usage of the term "object" in "object-oriented" systems, wherein objects have associated "methods", i.e. pieces of code associated with them, which code may be invoked through a reference to the object. However, the present invention is applicable to such object-oriented systems.

As previously mentioned, in one embodiment addresses are transformed by deliberately misaligning them. For performance and other reasons, most processors in common use today require multi-byte data words (e.g. four-byte and eight-byte ones), such as integers, to be stored in memory at locations that align to a word boundary (that is, the memory location addresses are, at least, even numbers.) This arrangement is illustrated in FIG. 1 which shows a section 100 of memory in which word boundaries 102-106 are located at even memory addresses (higher addresses are on the left in FIGS. 1-4). FIG. 1 shows a four-byte data word 110 and an eight-byte data word 108 stored sequentially at locations that are aligned to the word boundaries 106 and 104, respectively. FIG. 1 also shows a pointer 114 which references the start of the four byte word 110.

FIG. 2 shows the same memory section 200 where the words are stored in memory locations that are misaligned to the word boundaries. In particular, in FIG. 2, elements that correspond to elements in FIG. 1 are given corresponding numeral designations. For example, four-byte word 110 in FIG. 1 corresponds to four-byte word 210 in FIG. 2. As shown in FIG. 2, words 208 and 210 are not aligned to the word boundaries 206 and 204. Instead the beginning 212 of word 210 is located at a slightly higher address than word boundary 206, for example, one byte higher. Pointer 214 references the start of word 208 and thus is also misaligned.

In order to detect this situation shown in FIG. 2, most operating systems and processors have a misaligned address trap which detects the condition when the word is accessed. For example, such traps are found in the DOS and Windows™ operating systems developed and marketed by Microsoft Corporation, One Microsoft Way, Redmond, Wash.; the MAC OS operating systems developed and marketed by Apple Computer, Inc., One Infinite loop, Cupertino, California, Unix, Linux and Sun Microsystems Solaris™ operating system, the AIX operating system developed and marketed by International Business Machines Corporation among others. The traps examine various bits in the address to determine whether the access is to data that is word aligned. Such an access can take place when a pointer is dereferenced, that is, the pointer address is used to access a value in the memory at that address, for example, for a load or store operation. Since the pointer 114 in FIG. 1 references a word boundary, dereferencing this pointer would not raise a misaligned address trap. However, dereferencing pointer 214 in FIG. 2 would raise the trap because the data is not aligned on a word boundary.

FIG. 3 shows the same memory section 300 where the words are stored in memory locations that are aligned to the word boundaries. In particular, in FIG. 3, elements that correspond to elements in FIGS. 1 and 2 are given corresponding numeral designations. For example, four-byte word 110 in FIG. 1 corresponds to four-byte word 310 in FIG. 3. As shown in FIG. 3, words 308 and 310 are aligned to the word boundaries 306 and 304. However, in one embodiment of the invention, a pointer 314 is misaligned because it does not point to the start of four-byte word 310, but instead to a slightly higher address than word boundary 306. In accordance with the principles of the invention, dereferencing the pointer 314 in FIG. 3 would also raise the misalignment trap, not because the data is misaligned, but because the pointer 314 itself is misaligned.

Normally, the trap generates an error; however, in most cases, a special error handler can be defined to perform specified processing when the trap condition is detected. The address trap itself generates overhead, but some faulting address traps are extremely efficient. An example of such an efficient faulting address trap is the UTRAP misalignment trap found in the Solaris™ operating system marketed by Sun Microsystems, Inc. 4120 Network Circle, Santa Clara, Calif. 95054.

In accordance with the principles of the present invention, references to the selected objects in the subset of interest are manipulated so that they are deliberately transformed and thus, the faulting address trap will be raised when the objects are accessed by a thread. In the embodiment discussed above, the references are misaligned, but the objects themselves are left in memory at locations that are aligned to word boundaries. For example, a simple way to misalign references to the selected object subset is by setting the least significant bit of each reference to "1". This produces a shift in the apparent object location so that the apparent location is misaligned. In other embodiments, other techniques can be used to misalign references. For example, more than one bit can be set to "1." In addition, any arithmetic operation can be performed that produces an odd result. In general, any operation that replaces a reference with a transformed one in a manner that is reversible can be used.

In other embodiments, other methods for transforming a reference can be used instead of misaligning the references. For example, it is possible to transform a reference so that an operating system trap other than a misaligned address trap is raised when the reference is dereferenced. These other traps may be advantageous depending on the efficiency of such the specific trap mechanism.

One such trap is based on a mapping or memory protection violation and generates what is commonly known as an SEGV error. In order to use such a trap instead of a misalignment trap, an address range is selected that is (1) in the first few pages of the address space, (2) known to be unmapped or (3) reserved for the kernel (and so lacks appropriate permission for user-level thread access). Then, instead of misaligning references as discussed above, references to objects in the set being selected are transformed by changing them to addresses in the chosen range in such a manner that the change can be reversed. This is illustrated schematically in FIG. 4 where the pointer 414 that may have originally pointed to object 410, has been transformed to point instead to a protected memory area 418 or to an unmapped area of memory. For example, a table can be used to associate the transformed references with the untransformed values. The references can then be untransformed by reading the table to retrieve the original reference value. This is indicated schematically by dotted arrow 420. Another alternative is to use a table that maps indexes to references. When a reference must be transformed, it is added to the table and replaced with the equivalent index. The index is chosen to be misaligned (for example, by setting the least significant bit to "1" and using the rest of the word to actually store the index). With this arrangement, a reference can be untransformed by using the transformed reference as an index, performing a table lookup, and retrieving the original reference. Each time such a transformed reference is dereferenced by an application thread, the operating system will raise the faulting address trap, the faulting thread will enter the predefined trap-handler and the trap handler will then determine what action needs to be taken There are several ways of ensuring that all necessary addresses have been transformed. One way to achieve this is to stop all application threads, transform the addresses and restart the threads. However, this mechanism can generate long pauses that may be unacceptable. It is also possible to transform most of the addresses concurrently and then stop the application threads to ensure that the rest of the application threads are also transformed. This "mostly-concurrent" approach works particularly well with certain applications, such as garbage collectors that divide the heap into regions and maintain per-region remembered-sets that track memory locations containing incoming references to those regions.

Concurrent transformation can be performed in a mostly-concurrent manner similar to conventional methods for performing mostly-concurrent compaction in a garbage collection system. More specifically, references are concurrently transformed by first identifying references pointing to selected objects that are in use within a subset of memory. As these references are identified, they are transformed and added to a data structure. The identification of the references, their transformation, and addition of the references to the data structure may all be performed concurrently with execution of the other application threads. At the same time, a write barrier marks those memory regions in which one or more references have been modified by the other application threads. Execution of all other application threads is then suspended. The marked memory regions are examined to identify any further references pointing to the selected objects. Any such identified references are added to the data structure. Those references contained in the data structure that continue to point to the selected objects are transformed and the application threads are restarted. A more detailed discussion of such a method for mostly-concurrent compaction which can be modified for mostly-concurrent transformation is disclosed in U.S. Pat. No. 6,249,793, the disclosure of which is hereby incorporated by reference.

Figure 5:
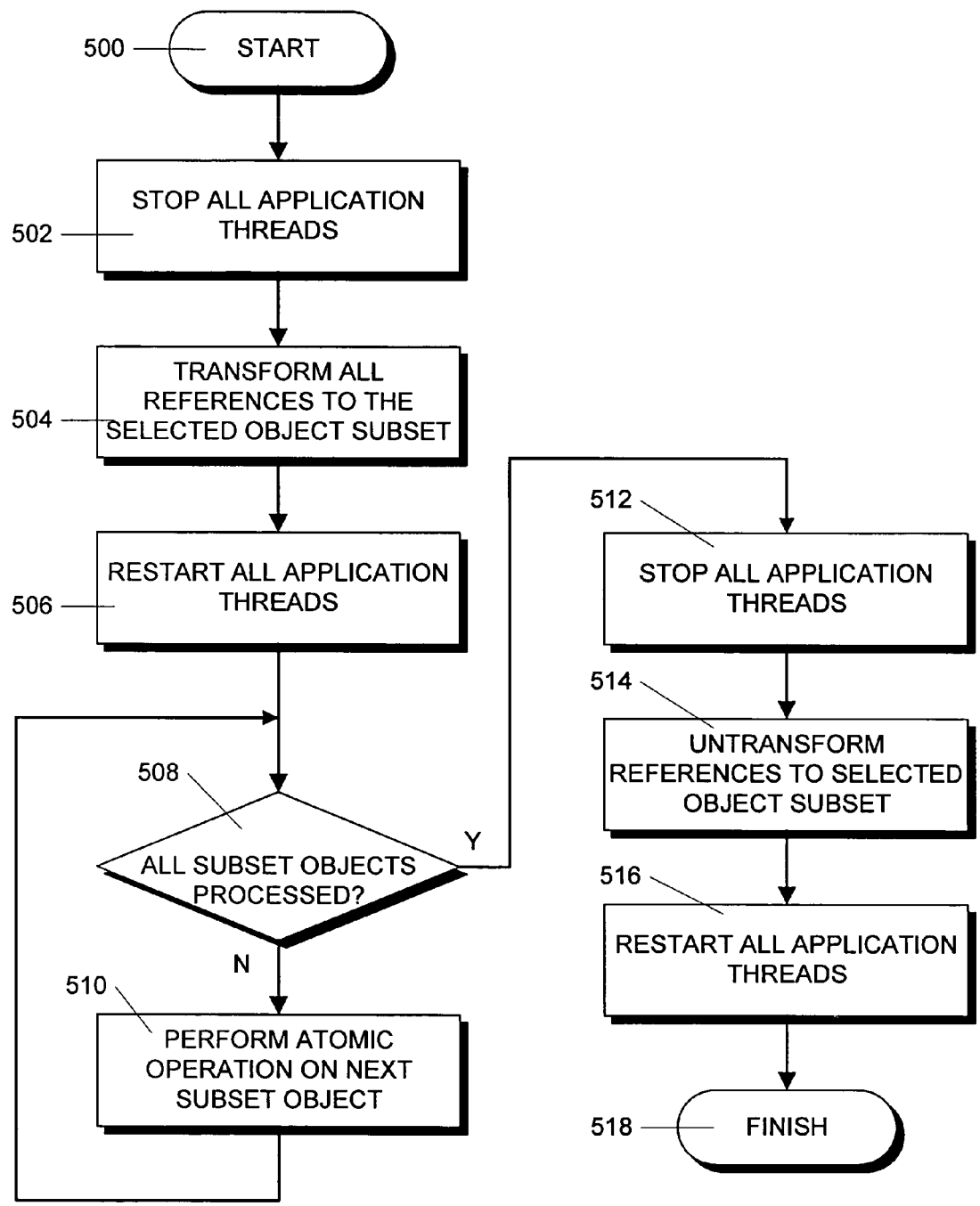
FIG. 5 is a flowchart that shows the steps in an illustrative process performed by a thread that is processing objects selected for atomic processing.

FIG. 5 is a flowchart illustrating an illustrative process performed by an application thread to select objects to be processed by the atomic operation. Although the illustrative process transforms all references in an STW fashion, the mostly-concurrent approach described above could also be used. The process begins in step 500 and proceeds to step 502 where all other application threads are stopped. In step 504, all references to the selected objects in the subset are transformed, for example, by setting the least significant bits to "1" or by one of the other techniques described above.

Next, in step 506, all application threads are restarted and processing of the selected objects in the subset begins. This latter processing might be performed by a separate thread, such as a garbage collection thread. In particular, in step 508, a determination is made whether all selected objects in the subset have been processed. If not, the process proceeds to step 510 where the atomic operation is performed on the next selected object in the subset. The process then proceeds back to step 508 to determine whether all selected objects in the subset have been processed by the atomic operation.

After all objects have been processed, references to selected objects that have not been previously untransformed, as discussed below, need to be untransformed to avoid an unnecessary performance penalty that results from the operation of the trap and trap handler. In particular, the process proceeds, from step 508 to step 512 where all other application threads are stopped again. In step 514, untransformed references to the selected objects in the object subset are untransformed as discussed above. It is also possible that references can be untransformed in a mostly-concurrent fashion in the same manner that they were transformed as discussed above. Finally, in step 516, all application threads are restarted and the process finishes in step 518.

If the application requires that steps 512-516 be executed frequently, another way to untransform the references is reverse the transformation during step 504 the next time that step is executed. For example, during step 504, a subset of the selected references could be transformed while another subset could be untransformed.

While the process illustrated in FIG. 5 is running, other application threads concurrently running with that process may attempt to access objects in the selected set of objects. In order to prevent another thread from accessing an object that is currently being processed and compromising the atomicity of the processing, the aforementioned faulting address trap is used to intercept attempted accesses so that the trap handler can deal with that thread. For example, the trap could be raised during the processing of steps 508 or 510 in FIG. 5.

FIGS. 6-9 illustrate illustrative processes that could be performed by a faulting address trap. In particular, if another application thread attempts to access the selected object being processed during steps 508 or 510, for example, by dereferencing a pointer to the object, the operating system will interrupt the processor and cause it to execute the trap handler that has been defined for that trap. The trap handler can perform the processes shown in one of FIGS. 6-9.

Figure 6:
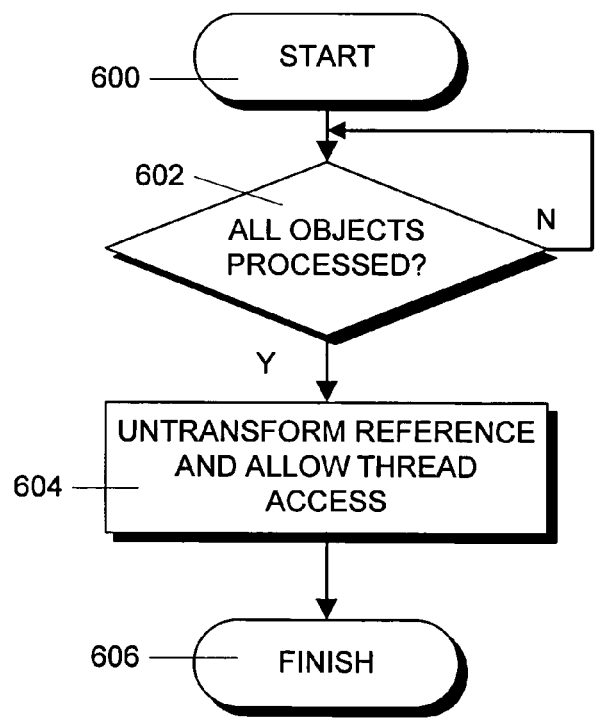
FIG. 6 is a flowchart that shows the steps in an illustrative process performed by a trap handler when another thread attempts to access an object that is a member of the subset selected for atomic processing.

FIG. 6 illustrates the simplest interaction between the trap handler and the thread that is performing the atomic processing. In this embodiment, there is minimal interaction. The process starts in step 600 and proceeds to step 602 where the trap handler simply waits for the processing of all selected objects to complete. As set forth in step 602, a determination is made whether all objects have been processed. If so, the process proceeds to step 604. If not, the process proceeds back to step 602 and continues to wait. The handler then untransforms the reference that caused the fault and allows the thread to access the object. The process then finishes in step 606. This process is particularly useful in situations where it is not possible to determine whether or not a given object has been processed. Since the thread that was attempting to access the object must wait until all objects are processed, this process can introduce a significant delay. Accordingly, in additional embodiments, the handler can perform additional processing to reduce the delay introduced by the trap processing.

Figure 7:
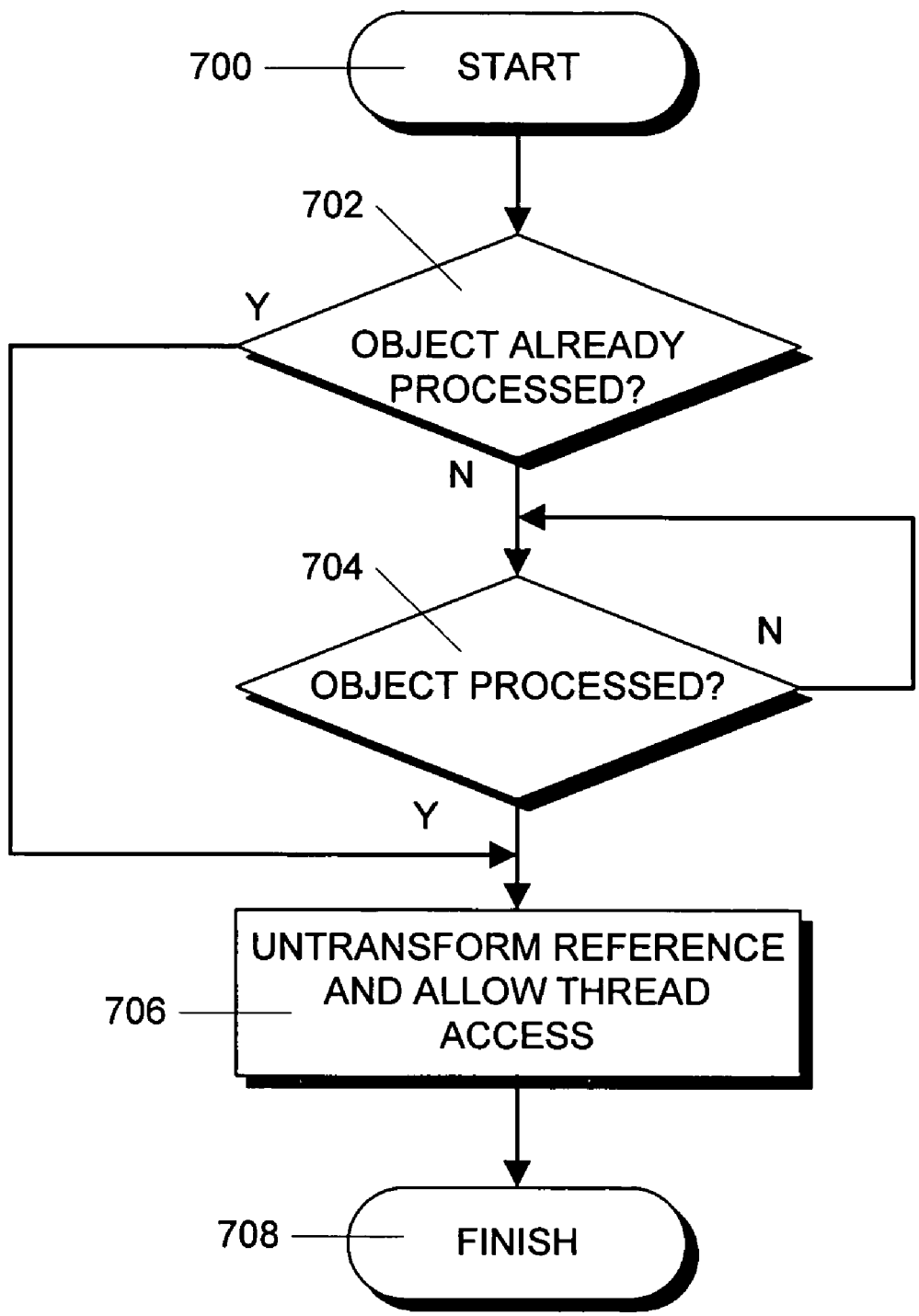
FIG. 7 is a flowchart that shows the steps in another illustrative process performed by a trap handler when another thread attempts to access an object that is a member of the subset selected for atomic processing.

In the embodiment shown in FIG. 7, the trap handler can determine whether the atomic processing has already been performed on a particular object. In this case, the thread attempting to access an object need wait only until that object has been processed. In particular, the trap handler process starts in step 700 and proceeds to step 702 where the trap handler determines whether the object has already been processed with the atomic operation. This could be determined in a number of ways. For example, this determination might be made by reserving one or more bits in the object header, which bit can be set by the application performing the atomic processing. The handler can then untransform the reference and read the object in order to check the bit to determine the processed state of the object. Reversing the transformation is necessary to cause the deliberately transformed reference to point to the actual location of the object. The reverse transformation process depends on the process that was used to transform the reference. For example, if the reference was misaligned by setting the least significant bit to one, realignment can be performed by setting the least significant bit of the reference to zero. Other transformations can be reversed in a similar manner. Alternatively, the objects can be processed in address order and the address of the last object processed can be stored. The handler can then check this stored address to determine whether the object has already been processed. In another embodiment, a table can be maintained indicating the objects that have been processed and this table can be checked to determine whether processing has been completed.

If the check in step 702 indicates that the object has already been processed by the atomic operation, then process proceeds to step 708 where the trap handler allows the application thread that attempted to access the object to, in fact, access the object. Alternatively, if, in step 702, it is determined that the object has not been processed, then the trap handler software enters a wait state in step 706 to allow the thread performing the atomic processing to process that object. The trap handler repeatedly checks the processed state of the object as set forth above and, when the object has been processed, the application thread can then be allowed to access the object as set forth in step 708. If the reference has not been previously untransformed, then the handler can untransform the reference prior to allowing the application thread to access the object. The process then finishes in step 710.

Figure 8:
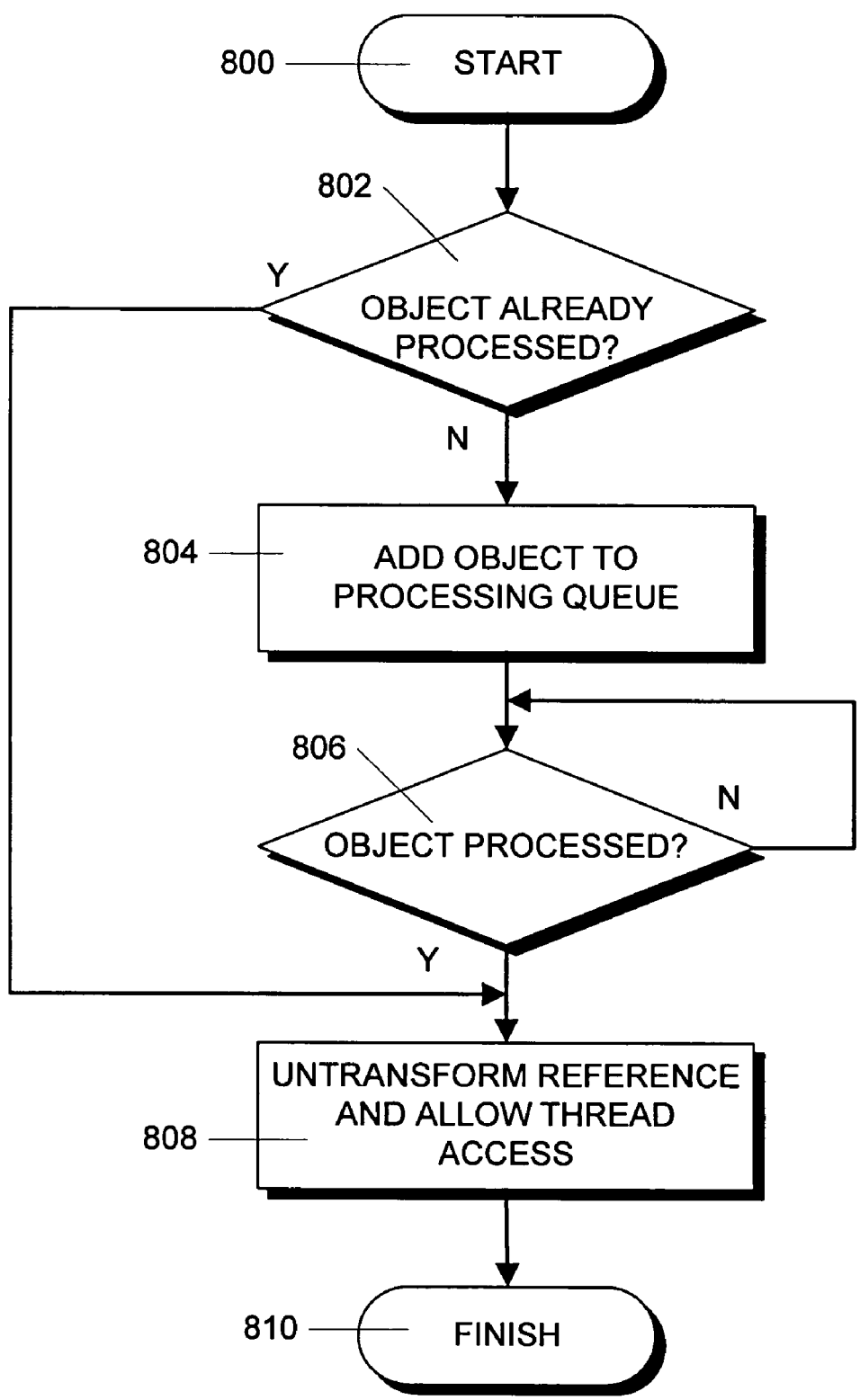
FIG. 8 is a flowchart that shows the steps in still another illustrative process performed by a trap handler when another thread attempts to access an object that is a member of the subset selected for atomic processing.

Another embodiment which reduces the delay produced by the trap handler is illustrated in FIG. 8. In this embodiment, a special processing queue is used. The application thread that is performing the atomic operation retrieves objects from this queue and processes them ahead of objects that are processed in the normal order (the normal processing is illustrated in step 510 of FIG. 5). This process starts in step 800 and proceeds to step 802 where, in response to an attempted access by another application thread to a selected object, the trap handler makes a determination whether the atomic operation has already been performed on that object. This determination can be made as described above. If atomic processing has been completed, the process proceeds to step 808 where the thread that attempted access is allowed to access the object. As previously mentioned, the trap handler may untransform the reference prior to allowing the application thread to access the object. The process then ends in step 810.

Alternatively, if it is determined in step 802 that atomic processing has not been completed, then, in step 804, the trap handler adds a reference to the object in question to the aforementioned processing queue and enters a wait state, as indicated in step 806, until the object has been processed by the thread performing the atomic operation. After the atomic processing has been performed, the thread attempting access to the object is allowed access in step 808 (untransforming the reference if the reference was not untransformed previously) and the process finishes in step 810. The embodiment shown in FIG. 8 has the advantage that the time that the application thread has to wait for the atomic operation to be performed or completed is reduced because the object in question is placed in a high priority queue and processed out of the ordinary order.

Figure 9:
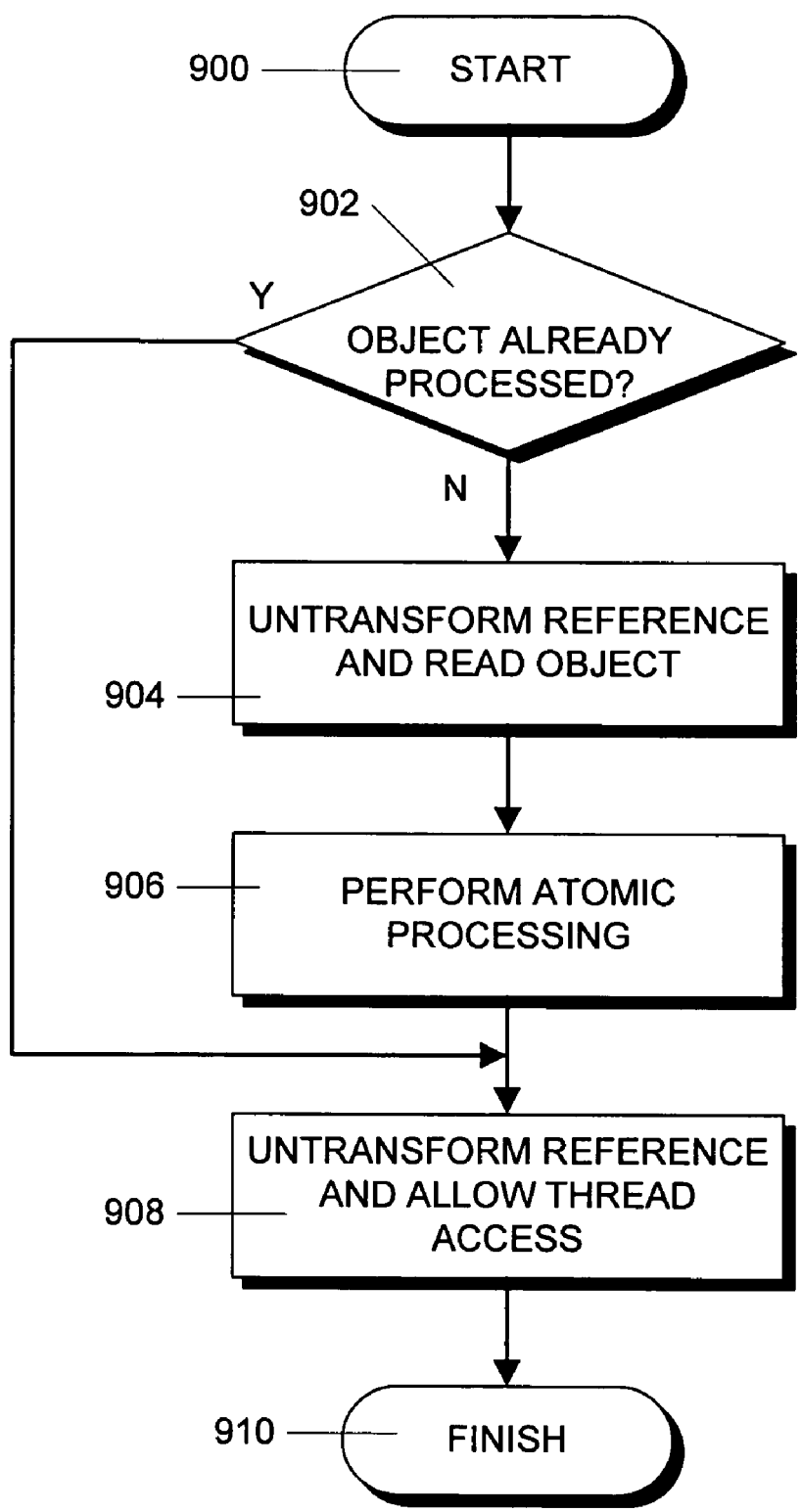
FIG. 9 is a flowchart that shows the steps in yet another illustrative process performed by a trap handler when another thread attempts to access an object that is a member of the subset selected for atomic processing.

Still another embodiment further reduces application wait time by having the trap handler itself perform the atomic processing. This embodiment is shown in FIG. 9. The process of this embodiment starts in step 900 and proceeds to step 902 where the handler determines whether the atomic operation has already been performed on the object. If atomic processing has been completed, the process proceeds to step 908 where the access-requesting thread is allowed access to the object (again, untransforming the reference, if necessary) and the process ends in step 910.

Alternatively, if it is determined in step 902 that atomic processing has not been completed, then, in step 904, the trap handler untransforms the reference in order to access the object and, in step 906, the handler itself performs the required atomic processing. Again, the process finishes in step 910.

The embodiment shown in FIG. 9 has the advantage that the time that the application thread has to wait for the atomic operation to be performed or completed is minimized because the handler itself performs the processing. One disadvantage is that races may develop between the trap handler and the thread that normally performs the atomic processing if both attempt to perform atomic processing on the same object. However, race conditions such as these can be handled by conventional means.

Use of a faulting address trap allows the efficient isolation of a subset of the objects in the heap without introducing an explicit barrier on every reference access. Prior art techniques relying on memory protection are generally considered very expensive and protect entire pages. Consequently, prior art memory protection techniques are more likely to cause more objects that necessary to be protected. This inventive technique is more powerful since it can be selective and isolate exactly the necessary objects and does not require specialized hardware. In addition, using a misaligned trap allows objects that are not contiguous in the heap to be processed.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be a LAN, WAN or the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different methods could be used for transforming references for the selected object subset and for untransforming the references. Further, the order of the process steps may also be changed without affecting the operation of the invention. Other aspects, such as the specific process flow, as well as other modifications to the inventive concept are intended to be covered by the appended claims.

What is claimed is:

1. A method for processing heap objects with an atomic operation using a faulting address trap, the method comprising:
   selecting, by a first thread of a plurality of concurrently executing threads, a subset of heap objects;
   transforming, by the first thread, each reference to each heap object of the subset of heap objects in such a manner that the faulting address trap will be raised if an attempt is made by any other thread of the plurality of concurrently executing threads to access the heap object with the transformed reference;
   processing, by the first thread, each heap object of the subset of heap objects with the atomic operation, wherein an indication that the atomic operation has been performed on the heap object is stored; and
   if the faulting address trap is raised during the processing of the subset of heap objects by the first thread because a second thread of the plurality of concurrently executing threads has attempted to access a heap object of the subset of heap objects, suspending the second thread until the atomic operation is performed on the heap object the second thread attempted to access.

2. The method of claim 1 wherein the faulting address trap is a misaligned address trap.

3. The method of claim 2 wherein transforming, by the first thread, each reference further comprises setting at least one bit of each reference to one.

4. The method of claim 2 wherein transforming, by the first thread, each reference further comprises setting a least significant bit of each reference to one.

5. The method of claim 1 wherein the faulting address trap is a memory protection trap.

6. The method of claim 5 wherein transforming, by the first thread, each reference further comprises changing each reference to point to one of an unmapped area of memory and a protected area of memory.

7. The method of claim 1 wherein the second thread is suspended until the atomic operation is performed on all of the subset of heap objects.

8. The method of claim 1 wherein suspending the second thread further comprises placing a reference to the heap object the second thread attempted to access in a queue, wherein the heap object the second thread attempted to access is processed with the atomic operation before heap objects that are not in the queue are processed with the atomic operation.

9. The method of claim 1 wherein suspending the second thread further comprises allowing the second thread to access the heap object the second thread attempted to access after the atomic operation is performed on that heap object.

10. The method of claim 1 wherein suspending the second thread further comprises determining, prior to suspending the second thread, whether the atomic operation has already been performed on the heap object the second thread attempted to access.

11. The method of claim 10 wherein suspending the second thread further comprises allowing the second thread to access the heap object the second thread attempted to access if the atomic operation has already been performed on the heap object the second thread attempted to access.

12. The method of claim 1 wherein processing, by the first thread, each heap object further comprises setting a bit in the heap object to indicate that the atomic operation has been performed on the heap object.

13. The method of claim 1 wherein processing, by the first thread, each heap object further comprises storing the indication that the atomic operation has been performed on the heap object in a table.

14. The method of claim 1 wherein processing, by the first thread, each heap object further comprises:
   processing the subset of heap objects in address order; and
   storing an address of a last heap object processed as the indication that the atomic operation has been performed.

15. The method of claim 1 wherein transforming, by a first thread, each reference further comprises:
   stopping all other threads of the plurality of concurrently executing threads;

transforming each reference to each heap object of the subset of heap objects; and
restarting all other threads of the plurality of concurrently executing threads.

16. The method of claim 1 wherein transforming, by a first thread, each reference further comprises:
transforming references to some heap objects of the selected subset of heap objects without stopping all other concurrently executing threads;
stopping all other threads of the plurality of concurrently executing threads;
transforming references to a remainder of the subset of heap objects whose references are not already transformed; and
restarting all other threads of the plurality of concurrently executing threads.

17. The method of claim 1 further comprising:
untransforming, by the first thread, each reference to each of the subset of heap objects after all of the subset of heap objects have been processed with the atomic operation.

18. The method of claim 17 wherein untransforming, by the first thread further comprises:
stopping all other threads of the plurality of concurrently executing threads;
untransforming each reference to each heap object of the subset of heap objects; and
restarting all other threads of the plurality of concurrently executing threads.

19. The method of claim 17 wherein untransforming, by the first thread further comprises:
untransforming references to some heap objects of the subset of heap objects without stopping all other concurrently executing threads;
stopping all other threads of the plurality of concurrently executing threads;
untransforming references to a remainder of the subset of heap objects whose references are not already untransformed; and
restarting all other threads of the plurality of concurrently executing threads.

20. Apparatus for processing selected heap objects with an atomic operation using a faulting address trap, the apparatus comprising:
a memory storing a plurality of heap objects and a faulting address trap handler for the faulting address trap; and
a processor that executes a plurality of concurrently executing threads, wherein the plurality of concurrently executing threads can reference the plurality of heap objects,
wherein a first thread of the plurality of concurrently executing threads:
selects a subset of the plurality of heap objects;
transforms each reference to each heap object of the subset of heap objects in such a manner that the faulting address trap will be raised if an attempt is made by any other thread of the plurality of concurrently executing threads to access the heap object with the transformed reference; and
processes each heap object of the subset of heap objects with the atomic operation, wherein an indication that the atomic operation has been performed on the heap object is stored; and
wherein the faulting address trap handler:
suspends the second thread if the faulting address trap is raised during the processing of the subset of heap objects by the first thread because a second thread of the plurality of concurrently executing threads has attempted to access a heap object of the subset of heap objects, wherein the second thread is suspended until the atomic operation has been is performed on the heap object the second thread attempted to access.

21. The apparatus of claim 20 wherein the faulting address trap is a misaligned address trap.

22. The apparatus of claim 21 wherein the first thread further transforms each reference by setting at least one bit of each reference to one.

23. The apparatus of claim 22 wherein the first thread further transforms each reference by setting a least significant bit of each reference to a selected heap object to one.

24. The apparatus of claim 20 wherein the faulting address trap is a memory protection trap.

25. The apparatus of claim 24 wherein the first thread further transforms each reference by changing each reference to point to one of an unmapped area of memory and a protected area of memory.

26. The apparatus of claim 20 wherein the faulting address trap handler further suspends the second thread until the atomic operation is performed on all of the subset of heap objects.

27. The apparatus of claim 20 wherein the faulting address trap handler further places a reference to the heap object the second thread attempted to access in a queue, wherein the heap object the second thread attempted to access is processed with the atomic operation before heap objects that are not in the queue are processed with the atomic operation.

28. The apparatus of claim 20 wherein the faulting address trap handler further allows the second thread to access the heap object the second thread attempted to access after the atomic operation is performed on that heap object.

29. The apparatus of claim 20 wherein the faulting address trap handler further determines, prior to suspending the second thread, whether the atomic operation has already been performed on the heap object the second thread attempted to access.

30. The apparatus of claim 29 wherein in the faulting address trap handler further allows the second thread to access the heap object the second thread attempted to access if the atomic operation has already been performed on the heap object the second thread attempted to access.

31. The apparatus of claim 20 wherein the first thread further processes each heap object by setting a bit in the heap object to indicate that the atomic operation has been performed on the heap object.

32. The apparatus of claim 20 wherein the first thread further processes each heap object by storing the indication that the atomic operation has been performed on the heap object in a table.

33. The apparatus of claim 20 wherein the first thread further processes each heap object by:
processing the subset of heap objects in address order; and
storing an address of a last heap object processed as the indication that the atomic operation has been performed.

34. The apparatus of claim 20 wherein the first thread further transforms each reference by:
stopping all other threads of the plurality of concurrently executing threads;
transforming each reference to each heap object of the subset of heap objects; and
restarting all other threads of the plurality of concurrently executing threads.

35. The apparatus of claim 20 wherein the first thread further transforms each reference by:
- transforming references to some heap objects of the subset of heap objects without stopping all other concurrently executing threads;
- stopping all other threads of the plural of concurrently executing threads;
- transforming references to a remainder of the subset of heap objects whose references are not already transformed; and
- restarting all other threads of the plurality of concurrently executing threads.

36. The apparatus of claim 20, wherein the first thread further untransforms each reference to each of the subset of heap objects after all of the subset of heap objects have been processed with the atomic operation.

37. The apparatus of claim 36 wherein the first thread further untransforms each reference by:
- stopping all other threads of the plurality of concurrently executing threads;
- untransforming each reference to each heap object of the subset of heap objects; and
- restarting all other threads of the plurality of concurrently executing threads.

38. The apparatus of claim 36 wherein the first thread further untransforms each reference by:
- untransforming references to some heap objects of the subset of heap objects without stopping all other concurrently executing threads;
- stopping all other threads of the plurality of concurrently executing threads;
- untransforming references to a remainder of the subset of heap objects whose references are not already untransformed; and
- restarting all other threads of the plurality of concurrently executing threads.

39. Apparatus for processing selected heap objects with an atomic operation using a faulting address trap, the apparatus comprising:
- means for selecting, by a first thread of a plurality of concurrently executing threads, a subset of heap objects;
- means for transforming, by the first thread, each reference to each heap object of the subset of heap objects in such a manner that the faulting address trap will be raised if an attempt is made by any other thread of the plurality of concurrently executing threads to access the heap object with the transformed reference;
- means for processing, by the first thread, each heap object of the subset of heap objects with the atomic operation, wherein an indication that the atomic operation has been performed on the heap object is stored; and
- means operable if the faulting address trap is raised during the processing of the subset of heap objects by the first thread because a second thread of the plurality of concurrently executing threads has attempted to access a heap object of the subset of heap objects, for suspending the second thread until the atomic operation is performed on the heap object the second thread attempted to access.

40. A computer readable medium comprising computer program code stored therein for processing selected heap objects with an atomic operation using a faulting address trap, the computer program code comprising:
- program code for selecting, by a first thread of a plurality of concurrently executing threads, a subset of heap objects;
- program code for transforming, by the first thread, each reference to each heap object of the subset of heap objects in such a manner that the faulting address trap will be raised if an attempt is made by any other thread of the plurality of concurrently executing threads to access the heap object with the transformed reference;
- program code for processing, by the first thread, each heap object of the subset of heap objects with the atomic operation, wherein an indication that the atomic operation has been performed on the heap object is stored; and
- program code operable if the faulting address trap is raised during the processing of the subset of heap objects by the first thread because a second thread of the plurality of concurrently executing threads has attempted to access a heap object of the subset of heap objects, for suspending the second thread until the atomic operation is performed on the heap object the second thread attempted to access.

* * * * *

UNITED STATES PATENT AND TRADEMARK OFFICE
CERTIFICATE OF CORRECTION

| | |
|---|---|
| PATENT NO. | : 7,313,566 B1 |
| APPLICATION NO. | : 11/021260 |
| DATED | : December 25, 2007 |
| INVENTOR(S) | : Antonios Printezis et al. |

It is certified that error appears in the above-identified patent and that said Letters Patent is hereby corrected as shown below:

In Claim 16, column 11 (line 8), delete "selected".

In Claim 35, column 13 (line 6), delete "plural" and replace with --plurality--.

Signed and Sealed this

Twenty-ninth Day of April, 2008

JON W. DUDAS
*Director of the United States Patent and Trademark Office*